(12) United States Patent
Winpenny

(10) Patent No.: US 7,338,209 B2
(45) Date of Patent: Mar. 4, 2008

(54) CLOSEABLE CONTAINER

(75) Inventor: Simon R. Winpenny, West Yorkshire (GB)

(73) Assignee: Illinois Tool Works Inc, Glenview, IL (US)

( * ) Notice: Subject to any disclaimer, the term of this patent is extended or adjusted under 35 U.S.C. 154(b) by 367 days.

(21) Appl. No.: 10/362,538

(22) PCT Filed: Jul. 31, 2001

(86) PCT No.: PCT/GB01/03435

§ 371 (c)(1),
(2), (4) Date: Jun. 18, 2003

(87) PCT Pub. No.: WO02/16215

PCT Pub. Date: Feb. 28, 2002

(65) Prior Publication Data

US 2004/0047520 A1    Mar. 11, 2004

(30) Foreign Application Priority Data

Aug. 24, 2000    (GB) .................... 0020951.0

(51) Int. Cl.
 *B65D 33/14*    (2006.01)
 *B65D 27/30*    (2006.01)
(52) U.S. Cl. ............... 383/5; 292/307 R; 292/320; 292/325
(58) Field of Classification Search ............. 383/5, 383/97; 292/307 R, 316, 318–323, 325, 292/307 A, 307 B; 24/16 PB
See application file for complete search history.

(56) References Cited

U.S. PATENT DOCUMENTS

| 3,149,869 A | * | 9/1964 | Chamberlin | ............. 292/320 |
| 4,008,914 A | * | 2/1977 | Anderson | ............. 292/307 R |
| 4,112,990 A | * | 9/1978 | Anderson | ............. 383/97 |
| 4,221,409 A | * | 9/1980 | Harley | ............. 292/322 |
| 4,602,405 A | | 7/1986 | Sturman et al. | |
| 4,682,688 A | * | 7/1987 | Budert | ............. 206/1.5 |
| 5,118,148 A | * | 6/1992 | De Lima Castro Netto | ............. 292/307 R |
| 6,360,411 B1 | * | 3/2002 | Bortz | ............. 24/704.2 |
| 6,533,335 B2 | * | 3/2003 | Hudson | ............. 292/307 R |

FOREIGN PATENT DOCUMENTS

| EP | 0 820 047 A1 | 1/1998 |
| GB | 1 424 680 | 2/1976 |
| GB | 2 115 354 | 9/1983 |
| GB | 2 355 233 | 4/2001 |

* cited by examiner

*Primary Examiner*—Jes F. Pascua
(74) *Attorney, Agent, or Firm*—Mark W. Croll; Paul F. Donovan

(57) ABSTRACT

The application describes a container, bag, pouch or reusable envelope which is closed by one part (2) locating over a second part (1), the second part(1) having an opening (7) for receiving the head (14) of a breakable seal (13) which locks into the opening in such a manner that it cannot be removed without breaking, the seal (13) in its inserted position locking the first part (2) in place over the second part (1) in a tamper evident fashion. The second part (1) has a shoulder (17) at either side of the opening (7) and the seal (13) has on its underside recesses (19) for registration with the shoulders (17). Typically said one part (2) is the fastener tab of the zipped opening of a reusable envelope and the second part (1) is the enclosure or chamber of a lock unit mounted on the envelope, adjacent one end of the zipped opening.

8 Claims, 4 Drawing Sheets

CLOSEABLE CONTAINER

The invention relates to a closeable container, for example a bag, pouch or reusable envelope, which has an opening which can be closed. The container has a lock unit at the opening which cooperates with a disposable locking member, to close the container.

The invention is, for example, concerned with the type of container described in GB-A-1424680. In this reference, an envelope with a zipped opening is described. At one end of the zipped opening is mounted the lock unit, this lock unit having a raised housing or chamber with an opening on one side. The fastener tab of the zip has a central aperture so that it can fit over the chamber and then a disposable sealing element (known for simplicity as a "seal") is pushed into the chamber to lock the fastener tab in place and thus lock the zipped opening. The seal is a substantially flat element, moulded from a suitable plastics material, which has a head part and a body part. Between these two parts is a weakened or frangible section and it is the head part which locks into the chamber by means of an arrowhead configuration. Due to this configuration, the seal cannot be removed whole from the chamber and must be broken in order to release the fastener tab of the zip. The lock unit and disposable seal thus provide tamper evidence to the container. For convenience, two of the figures of GB-A-1424680 are included in this application, labelled "prior art".

For the avoidance of any doubt, while the invention is concerned with a zipped envelope of the type discussed above, the invention which is set out below is also applicable to other types of containers where one part (lid, flap etc) can cooperate with another part (the main body of the container, for example) which has a lock unit.

The aim of the invention is to provide an improved lock unit for a closeable container, as well as a new container including such an improved lock unit.

According to the invention, there is provided a container, bag, pouch or reusable envelope which is closed by one part locating over a second part, the second part having an opening for receiving the head of a breakable seal which locks into the opening in such a manner that it cannot be removed without breaking, the seal in its inserted position locking the first part in place over the second part in a tamper evident fashion, characterized in that the second member has a shoulder at either side of the opening and the body part of the seal has on its underside at least one recess for registration with the shoulders.

Typically, the said one part is the fastener tab of the zipped opening of a reusable envelope and the second part is the enclosure or chamber of a lock unit mounted on the envelope, adjacent one end of the zipped opening.

Preferably the head part of the seal is formed with an indent for location on a corresponding protuberance within the second part or chamber. Alternatively, the chamber could include an indent into which a protuberance on the seal locates.

The arrangement of the shoulders locating in the recesses of the seal provides for very efficient location control of the seal on the lock unit, both in a vertical plane and in a horizontal plane. This location control can be further improved by means of the indent of the head part of the seal locating on the protuberance within the chamber.

The more precise location of the seal on the lock unit can in particular help to prevent "picking" of the lock unit, for example by means of a needle being inserted into the opening of the chamber to retract the barbs of the head of the seal. The fact that the seal has very limited movement in a horizontal or vertical plane means that there is a reduced scope for someone to force the seal to one side to create a gap into the chamber, between the edge of the seal and the edge of the opening.

The invention also relates to a novel chamber with the shoulders at its opening, and to the novel seal with the recesses on its underside.

A preferred embodiment of the invention is described in more detail below, with reference to the accompanying figures, wherein.

Figure 1:
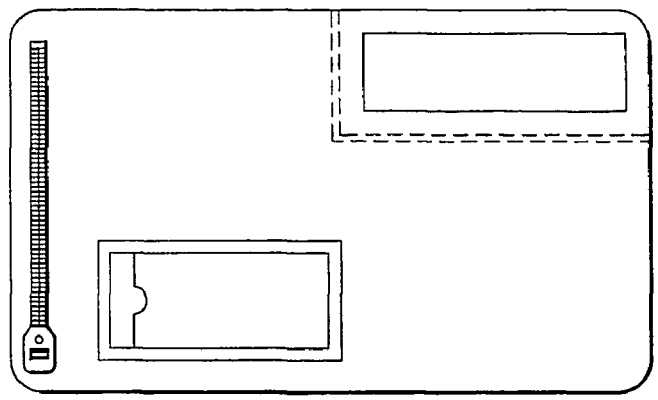
FIGS. 1 and 2 show the prior art design of GB-A-1424680.
Figure 2:
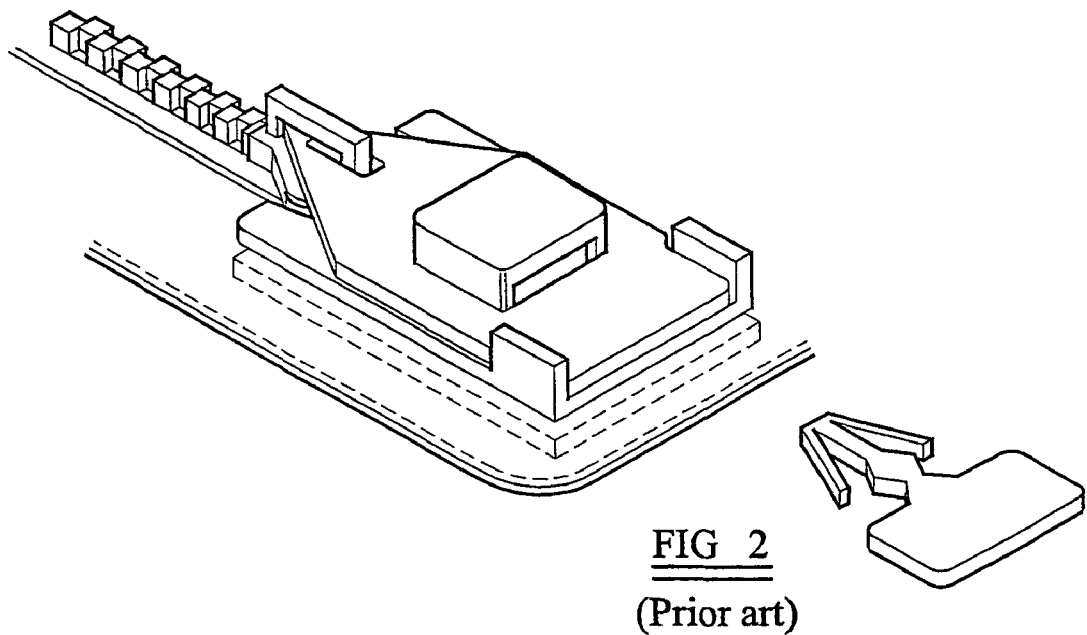
Figure 3:
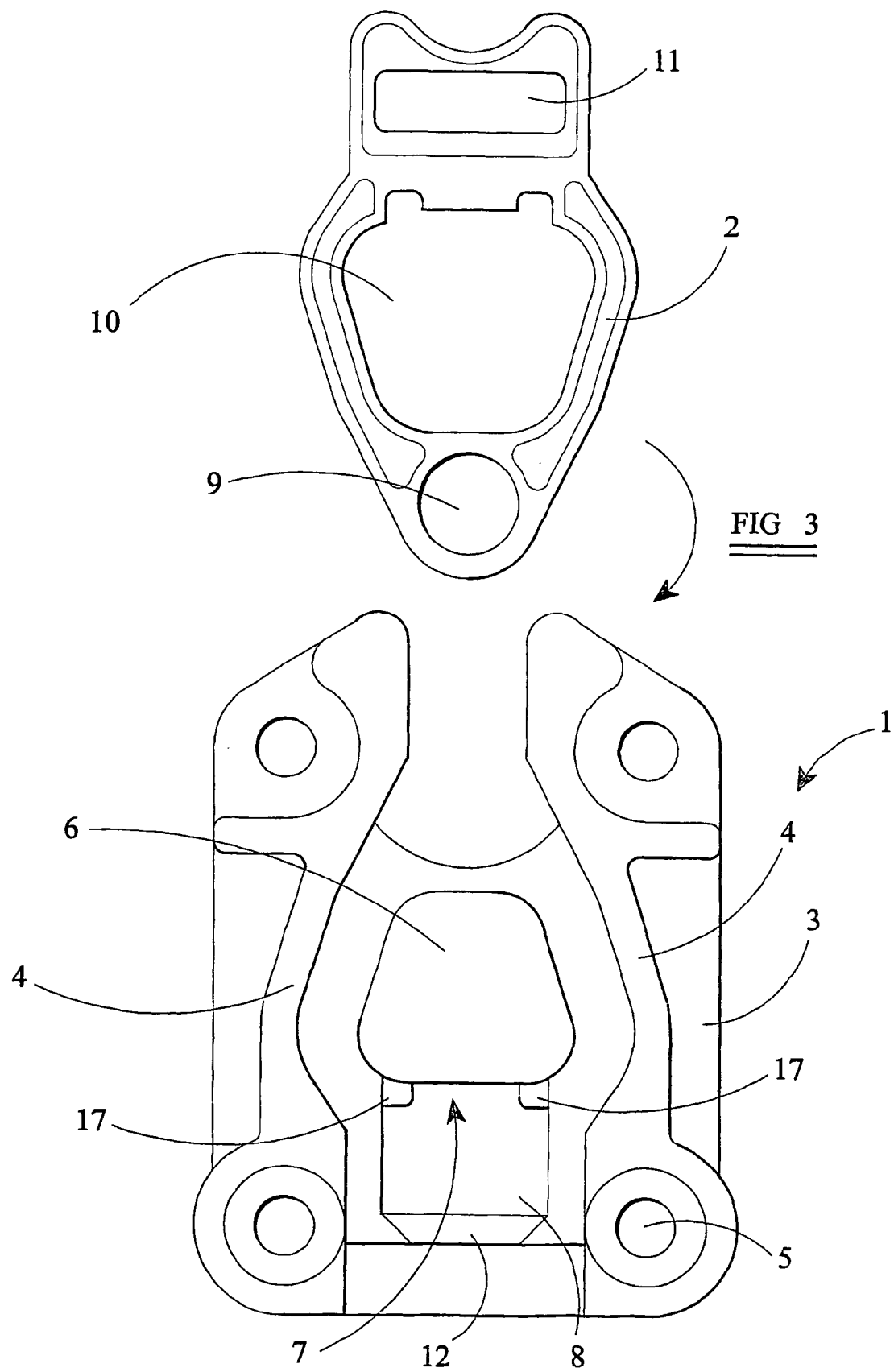
FIG. 3 shows in plan view the lock unit and fastener tab of a zipped reusable envelope according to one embodiment of the invention, the envelope not being shown.

FIG. 3 shows the lock unit 1 and fastener tab 2. The lock unit has a flat base 3 with a raised wall 4 which defines a seat for the fastener tab 2. The base has a series of apertures 5 which receive rivets which fix the lock unit on the material of the bag or envelope. Within the wall of the lock unit 1 there is a raised enclosure or chamber 6 which has at one side (the lower side as seen in FIG. 3) an opening 7. The base has a depression 8 which communicates with the chamber, to allow the broken part of the seal to be shaken out of the chamber in known fashion.

The fastener tab 2, in this embodiment, has three apertures 9, 10, 11. Aperture 9 is for connection with the zip puller, in known fashion; aperture 10 has a shape which corresponds to that of the chamber 6, to allow the fastener tab to locate over the chamber; the aperture 11 locates on a raised catch 12 on the base part of the lock unit, again in a known fashion.

The important and novel feature of the lock unit and chamber seen in FIG. 3 is the presence of the shoulder 17 at either side of the opening to the chamber (the shape of the shoulders is also seen in the later sectional FIG. 7).

Figure 4A:
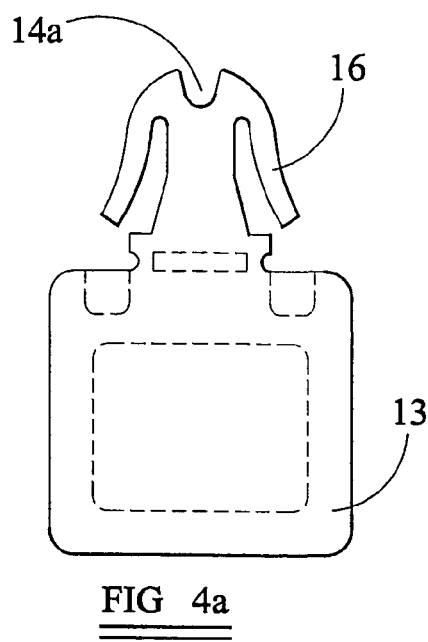
FIGS. 4a and 4b are top and bottom views of a seal to be used with the lock unit of FIG. 3.
Figure 4B:
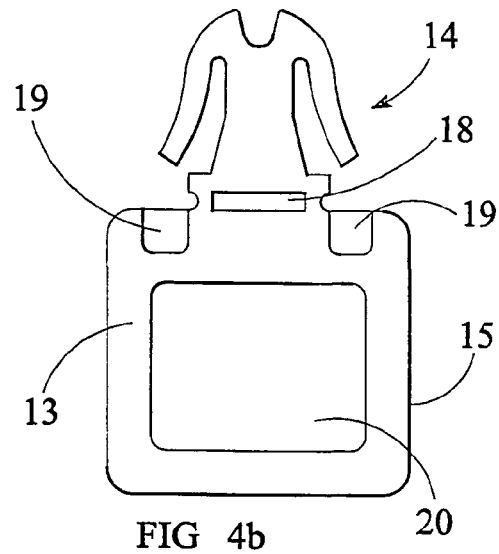

FIG. 4 shows the disposable and frangible seal 13 which has a head part 14 and body part 15. The head part has an arrowhead configuration with barbs 16, in a known fashion. The body part is, in this embodiment, substantially square with rounded corners, but of course it could be of any other desired shape. Between the body part and head part is an elongate recess 18 (see most clearly in the bottom view) which provides for the weakened and breakable connection between the head and body parts. Also, on the underside of the seal are recesses 19 in a position corresponding with the shoulders 17 of the chamber. The seal also has a central recessed portion 20, which is entirely optional, but reduces the use of material in the seal. In a less desirable embodiment the material between recesses 19 could be omitted to create a single, wide recess.

A further feature of the seal is the indent 14a in the head part 14.

Figure 5:
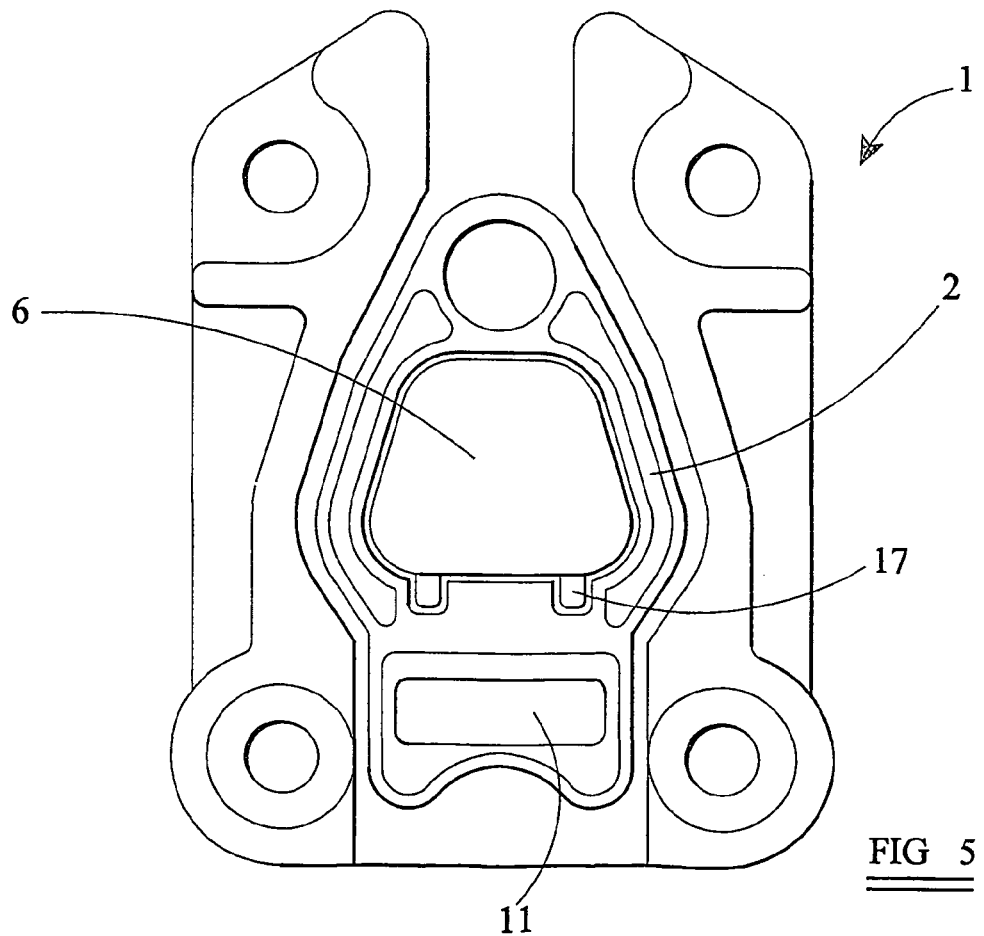
FIG. 5 is a top view showing the zip fastener tab in place on the lock unit.

As shown in FIG. 5, to close the bag or envelope the fastener tab 2 is located on the chamber 6 of the lock unit 1 in a known fashion. This position is shown in FIG. 5. It can be noted in particular that the aperture 10 of the fastener tab registers with the chamber, including the shoulders 17, while the aperture 11 locates on the raised catch 12 of the base of the locking unit. The height of the shoulders 17 is greater than the thickness of the tab 2, so that they protrude above the tab.

Figure 6:
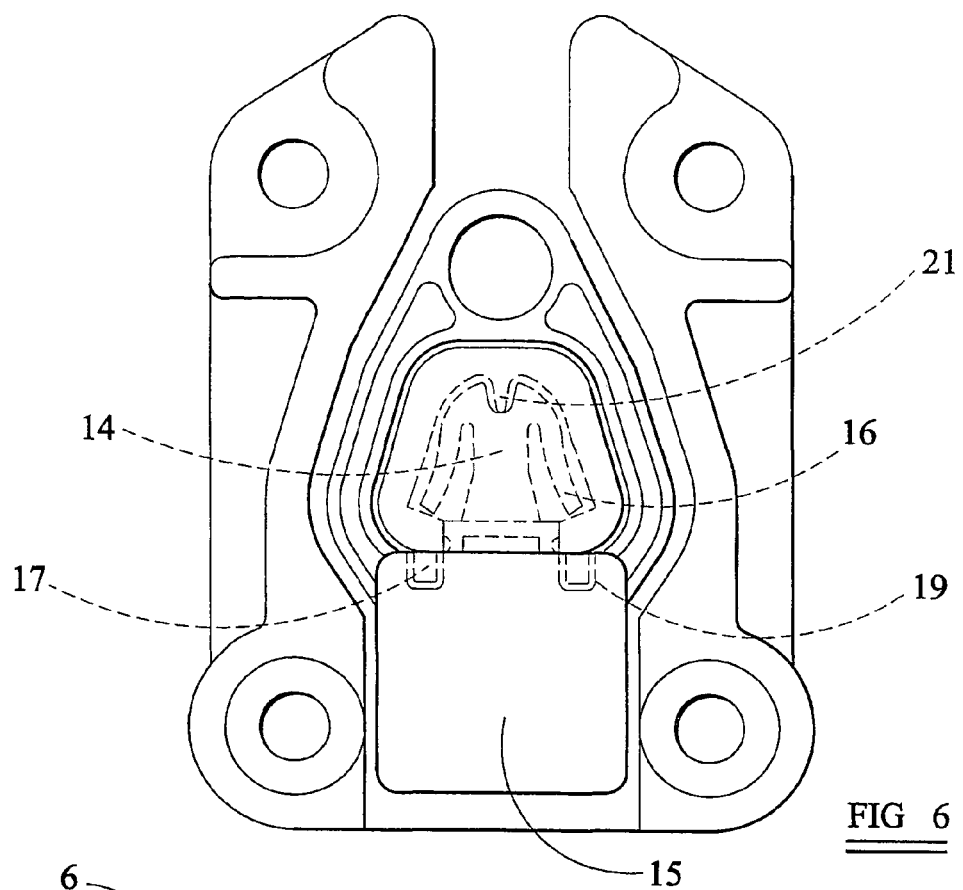
FIG. 6 is a plan view similar to that of FIG. 5 but showing the seal of FIG. 4 located in the lock unit.

To finally lock the envelope in a tamper evident fashion, the seal 13 shown in FIG. 4 is pushed into the chamber 6, the head part 14 of the seal locating within the chamber and in particular the barbs 16 locating behind the chamber walls in a known fashion, so that the seal cannot be removed without breaking the body part 15 from the head part 14. In this position, the body 15 of the seal overlaps part of the tab 2. The locked condition of the envelope is shown in FIG. 6, those parts of the seal and chamber which are not immediately visible being shown in dashed lines. FIG. 6 in particular shows the location of the shoulders 17 within the recesses 19 of the body part of the seal and the location of the indent 14a at the end of the head part of the seal on an inner protuberance or protrusion 21 on the inside of the chamber.

Figure 7A:
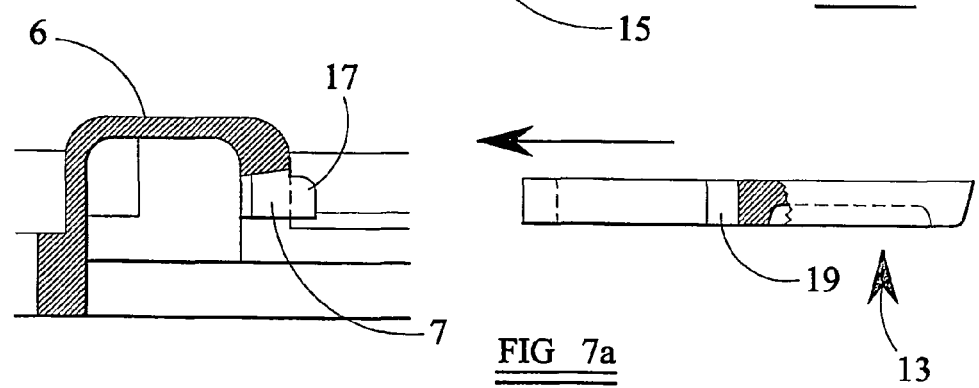
FIGS. 7a and 7b are explanatory sectional views of the seal and part of the lock unit, showing the location of the seal in the chamber of the lock unit.
Figure 7B:
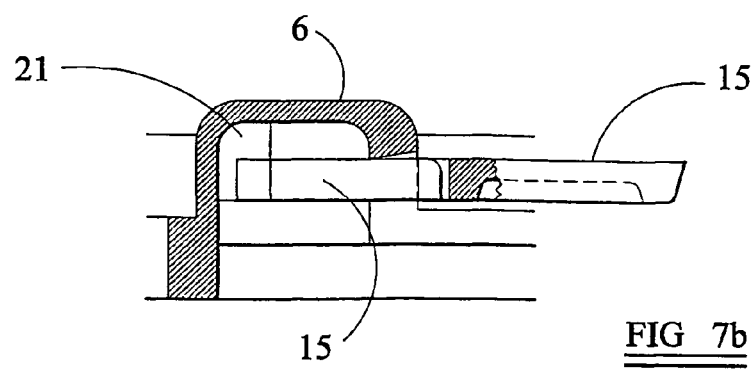

The sectional view of FIG. 7 shows the seal 13 approaching the chamber 6 (FIG. 7a) and then the seal located within the chamber (FIG. 7b). The views show in particular the shoulders 17 and the protuberance 21 within the chamber. It can be noted that the opening 7 of the chamber is tapered, that is the edge of the wall of the chamber above the opening is inclined with respect to the plane of the base 3 of the lock unit. This feature allows a close tolerance to be achieved between the thickness of the seal 13 and the top of the opening 7, while at the same time the tapered shape provides no hinderance to the seal being inserted.

It will be appreciated that by the location of the shoulders 17 in the recesses 19 of the seal, any significant lateral movement of the seal is prevented while at the same time any significant downward movement of the seal is also inhibited. Accordingly, the risk of the seal being maneuvered to a position relative to the chamber where a gap is left into the opening is reduced.

To open the envelope, the seal is broken and removed in a conventional fashion (this removal providing tamper evidence of an authorized opening). The head part 14 of the seal is shaken out from the lower part of the chamber which communicates with the depression 8 in the base 3 of the lock unit. This depression extends the width of the chamber, beneath the shoulders, so that the width of the depression is greater than the width of the opening 7 which initially receives the head of the seal.

The lock unit may be formed of a suitable material, such as hardened steel, or of plastics such as nylon, polypropylene, ABS, styrene or engineering plastics. The disposable seals, which will generally be supplied in bulk, are formed of a suitable resilient but frangible plastics material, such as styrene, nylon or polypropylene.

Although the invention has been described with reference to a zipped envelope it is equally relevant to other types of containers. For example, the container could have a flap with an aperture which registers with a lock unit on the main part of the container, the seal then going into the lock unit to secure it.

The invention claimed is:

1. A container, bag, pouch or envelope which is closed by one part (2) locating over a second part (1), the second part (1) having an opening (7) for receiving a head (14) of a breakable seal (13) which seal comprises said head and body part with a breakable connection therebetween and locks into the opening in such a manner that it cannot be removed without breaking, the seal (13) in its inserted position locking the one part (2) in place over the second part (1) in a tamper evident fashion, characterized in that the second part (1) has a shoulder (17) external of and at either side of the opening (7) and the seal (13) has on an underside of the body part at least one recess (19) for registration with the shoulders (17), wherein the shoulders have a height that is greater than a thickness of the one part (2) so that the shoulders protrude above the one part (2) when the one part (2) is located over the second part (1).

2. A container, bag, pouch or envelope according to claim 1, wherein the said one part (2) is a fastener tab of a zipped opening of a reusable envelope and the second part (1) is an enclosure or chamber of a lock unit mounted on the envelope, adjacent one end of the zipped opening.

3. A container, bag, pouch or envelope according to claim 1, wherein the head (14) of the seal (13) Is formed with an indent (14a) or protuberance for registration with a corresponding protuberance (21) or recess within the second part (1).

4. A container, bag, pouch or envelope according to claim 1, wherein the opening (7) of the second part (1) is inwardly tapered.

5. A container, bag, pouch or envelope according to claim 1, wherein the seal has a breakline and each recess (19) is adjacent the break line (18) of the seal (13), on the other side of the seal from the head (14).

6. A container, bag, pouch or envelope according to claim 1, wherein there is a pair of recesses (19).

7. An assembly comprising a breakable and disposable seal (13) in combination with reusable envelope having a lock unit (1) with a chamber (6) which in turn has shoulders (17) on either side of and external to an opening (7) for receiving the said seal, and a base (3) with a depression (8) which communicate with the chamber (6), the seal having a bead part (14), a body part (15) and at least one recess (19) in the body part on one side adjacent to the head of the seal which in use registers with the shoulders (17) in a position that is external to the opening (7), wherein each recess (19) is adjacent a break line (18) of the seal (13) on the other side of the seal from the head (14), such that when the seal is broken at break line (18), the head (14) can be shaken out of the chamber (6) by way of the depression (8).

8. A breakable and disposable seal according to claim 7, wherein there is a pair of recesses (19).

* * * * *